(12) United States Patent
Nishimura et al.

(10) Patent No.: US 11,282,381 B2
(45) Date of Patent: Mar. 22, 2022

(54) TRAFFIC SPEED ENFORCEMENT BASED ON LICENSE PLATE DETECTION

(71) Applicant: SONY GROUP CORPORATION, Tokyo (JP)

(72) Inventors: Hiroaki Nishimura, Paramus, NJ (US); Nikolaos Georgis, San Diego, CA (US); James Kuch, Wheaton, IL (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 16/906,250

(22) Filed: Jun. 19, 2020

(65) Prior Publication Data
US 2021/0398421 A1    Dec. 23, 2021

(51) Int. Cl.
| | |
|---|---|
| *G06T 7/00* | (2017.01) |
| *G08G 1/054* | (2006.01) |
| *G08G 1/04* | (2006.01) |
| *G06T 7/246* | (2017.01) |
| *G06T 7/254* | (2017.01) |

(52) U.S. Cl.
CPC ............. *G08G 1/054* (2013.01); *G06T 7/246* (2017.01); *G06T 7/254* (2017.01); *G08G 1/04* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,546,119 B2 | 4/2003 | Ciolli et al. | |
| 6,690,294 B1* | 2/2004 | Zierden | G08G 1/052 340/933 |
| 2012/0148092 A1* | 6/2012 | Ni | G06K 9/00785 382/103 |
| 2012/0148105 A1* | 6/2012 | Burry | G08G 1/0175 382/105 |
| 2014/0126780 A1* | 5/2014 | Wang | G08G 1/054 382/107 |
| 2016/0034778 A1* | 2/2016 | Wang | G08G 1/0175 382/105 |
| 2018/0211117 A1* | 7/2018 | Ratti | G06K 9/00785 |

(Continued)

FOREIGN PATENT DOCUMENTS

WO    2019/185217 A1    10/2019

*Primary Examiner* — Delomia L Gilliard
(74) *Attorney, Agent, or Firm* — Chip Law Group

(57) ABSTRACT

An electronic apparatus and method for traffic speed enforcement based on license plate detection is provided. The electronic apparatus controls an image-capture device on a first vehicle to capture a sequence of images of a second vehicle and detects a license plate of the second vehicle in the captured sequence of images. The electronic apparatus extracts a set of license plate images from a set of images in the sequence of images and determines a first change in a size of a first license plate image with respect to that of a second license plate image. The electronic apparatus further determines a speed of the first vehicle and a traffic speed violation by the second vehicle based on the determined first change and the determined speed of the first vehicle. The electronic apparatus further controls a media device to output a notification indicative of the determined traffic speed violation.

18 Claims, 5 Drawing Sheets

(56) References Cited

U.S. PATENT DOCUMENTS

| | | | |
|---|---|---|---|
| 2018/0225961 A1* | 8/2018 | Okamura | B60R 1/00 |
| 2019/0236395 A1* | 8/2019 | Meng | G08G 1/0175 |
| 2020/0066145 A1* | 2/2020 | Devor | G06T 7/97 |
| 2020/0401833 A1* | 12/2020 | Popov | G06K 9/6263 |

* cited by examiner

TRAFFIC SPEED ENFORCEMENT BASED ON LICENSE PLATE DETECTION

CROSS-REFERENCE TO RELATED APPLICATIONS/INCORPORATION BY REFERENCE

None.

FIELD

Various embodiments of the disclosure relate to learning-based image processing, computer vision, and camera technologies. More specifically, various embodiments of the disclosure relate to an electronic device and method for traffic speed enforcement based on license plate detection.

BACKGROUND

Advancements in radio and laser technology have helped traffic enforcement agencies to measure speed of moving vehicles and detect whether such vehicles violate a legal speed limit in a given zone. Conventionally, traffic enforcement agencies have speed guns on police vehicles to determine a speed of a moving vehicle. Not all counties or districts can afford to have widespread implementation of such advanced speed guns (such as radar guns or lidar guns) as they are expensive.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for traffic speed enforcement based on license plate detection is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for traffic speed enforcement based on license plate detection. The disclosed electronic apparatus may control an image-capture device (such as a dash camera) to capture images from a first vehicle (such as an enforcement vehicle) and perform an accurate Automatic Licenses Plate Recognition (ALPR) to detect a license plate of a second vehicle (a potentially offender vehicle) from the images. Based on the accurate ALPR, the disclosed electronic apparatus may determine and accurately track changes in font-sizes of a license plate number on successive license plate images of the second vehicle or in sizes of the successive license plate images. Through such determination, the disclosed electronic apparatus may determine whether the second vehicle is in violation of a defined speed limit. Since the disclosed electronic apparatus makes use of a camera to determine a traffic speed violation, the bill of materials (BOM) for the disclosed electronic apparatus may be significantly less than that for a traditional radar gun or a lidar gun on an enforcement vehicle. This may result in significant cost reduction with ALPR capable of delivering high quality and accurate evidential images of license plates.

While a traditional radar gun has a limited scan area and the driver of the enforcement vehicle has to point the radar gun in a desired direction to detect a traffic speed violation in the desired direction, the disclosed electronic apparatus can make use of multiple inexpensive image-capture devices on the first vehicle to monitor traffic in different directions. Additionally, while a traditional radar gun may detect one speed violation at time, the accurate ALPR may detect license plates of several vehicles from a single feed of images. This may help to concurrently track traffic speed violations of several vehicles.

Figure 1:
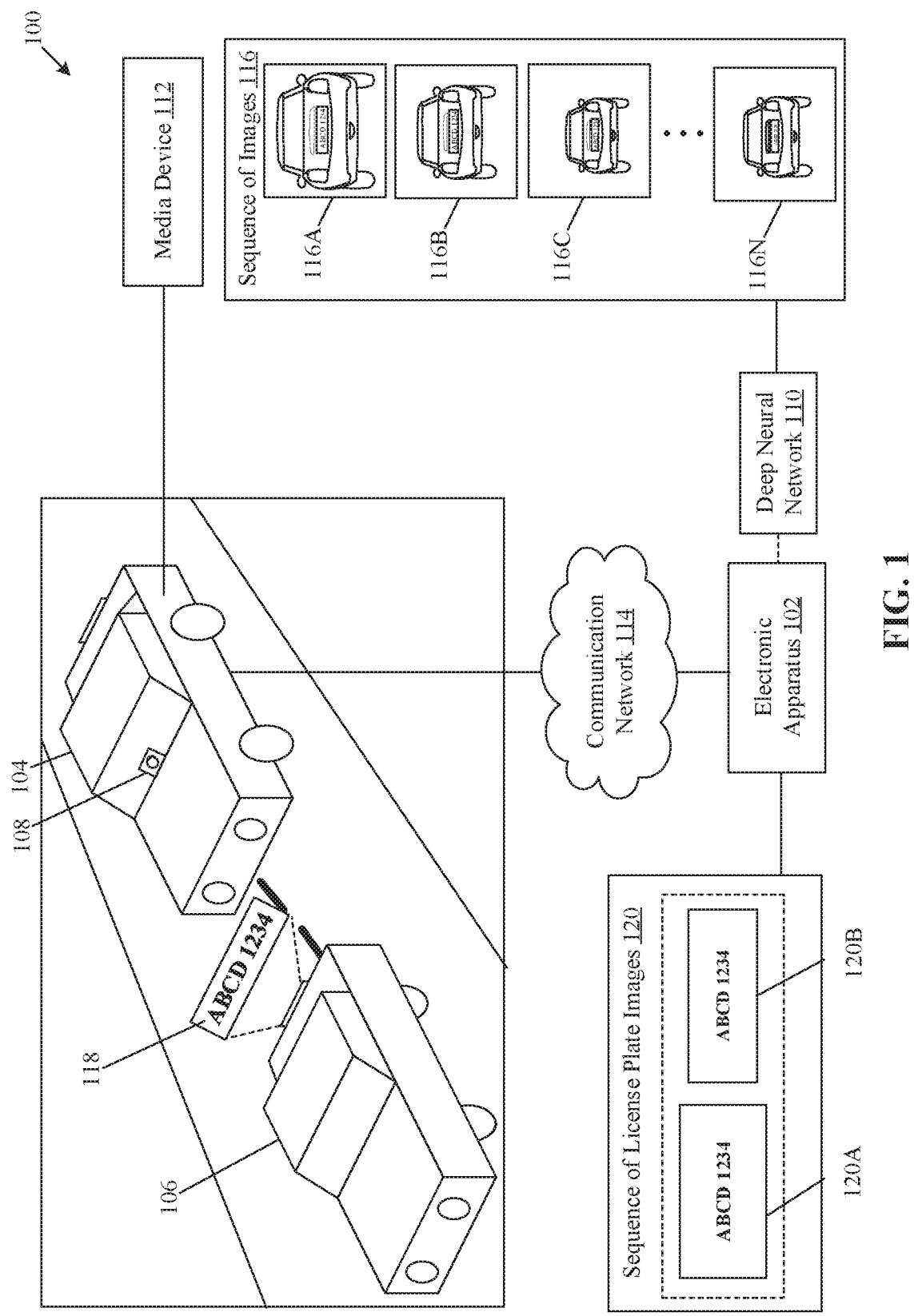
FIG. 1 is a diagram that illustrates an environment for traffic speed enforcement based on license plate detection, in accordance with an embodiment of the disclosure.

FIG. 1 is a diagram that illustrates an environment for traffic speed enforcement based on license plate detection, in accordance with an embodiment of the disclosure. With reference to FIG. 1, there is shown a diagram of an environment 100. The environment 100 includes an electronic apparatus 102, a first vehicle 104, a second vehicle 106, and an image-capture device 108 installed in the first vehicle 104. A Deep Neural Network (DNN) 110 may be implemented on the electronic apparatus 102. The environment 100 may also include a media device 112 and a communication network 114 which may be established for the electronic apparatus 102 to communicate with the image-capture device 108 and the media device 112.

The electronic apparatus 102 may include suitable logic, circuitry, interfaces, and/or code that may be configured to determine a traffic speed violation by the second vehicle 106. Such a violation may be determined based on changes in a size of successive license plate images of the second vehicle 106 or changes in font-size of a license plate number on the successive license plate images of the second vehicle 106. The speed of the first vehicle 104 may be used as reference to determine the traffic speed violation. Example implementations of the electronic apparatus 102 may include, but are not limited to, a camera, an in-vehicle Electronic Control Unit (ECU), a police mobile data terminal, a vehicle tracking computer, a server, a smartphone, a mobile phone, and/or any electronic device with an image processing capability.

The first vehicle 104 may be a non-autonomous vehicle, a semi-autonomous vehicle, or a fully autonomous vehicle, for example, as defined by National Highway Traffic Safety Administration (NHTSA). The first vehicle 104 may be registered as a police vehicle or may be managed on behalf of a traffic police department or any authorized governmental or non-governmental organization. Examples of the first vehicle 104 may include, but are not limited to, a two-wheeler vehicle, a three-wheeler vehicle, a four-wheeler vehicle, a hybrid vehicle, or any manned or unmanned (driverless) vehicle. In an embodiment, the first vehicle 104 may be a vehicle with autonomous drive capability that uses one or more distinct renewable or non-renewable power sources. In another embodiment, the first vehicle 104 may be an unmanned aerial vehicle (UAV), which may be deployed to remotely track on-road vehicles for traffic speed violations.

The four-wheeler car in FIG. 1 is merely provided as an example of the first vehicle 104. The present disclosure may be applicable to other types of vehicle (e.g., a bike or a truck). The description of such types of vehicle is omitted from the disclosure for the sake of brevity.

The second vehicle 106 may be a non-autonomous vehicle, a semi-autonomous vehicle, or a fully autonomous vehicle, for example, as defined by National Highway Traffic Safety Administration (NHTSA). Examples of the first vehicle 104 may include, but are not limited to, a two-wheeler vehicle, a three-wheeler vehicle, a four-wheeler vehicle, a truck, a bus, a hybrid vehicle, or any manned or unmanned (driverless) vehicle which can carry a license plate. The four-wheeler car in FIG. 1 is merely provided as an example of the second vehicle 106. The present disclosure may be applicable to other types of vehicle (e.g., a bike or a truck). The description of such types of vehicle is omitted from the disclosure for the sake of brevity.

The image-capture device 108 may include suitable logic, circuitry, and interfaces that may be configured to capture a sequence of images 116 of the second vehicle 106, which may be in a field-of-view (FOV) of the image-capture device 108. As shown, the captured sequence of images 116 include a first image 116A, a second image 116B, a third image 116C, and an Nth image 116N.

In FIG. 1, the image-capture device 108 is merely shown as an example implementation of a dashcam mounted on a windshield of the first vehicle 104. The present disclosure may be applicable to other suitable implementations of the image-capture device 108. The image-capture device 108 may be mounted on any mounting position on the first vehicle 104 to cover traffic in any suitable direction. For example, the image-capture device 108 may be placed behind a front windshield (facing forward traffic), on a front grill, on a roof, on a rear windshield or trunk (facing rearward traffic), or on sides of the second vehicle 106. Each mounting position may help the image-capture device 108 to acquire images of traffic from a particular direction.

Examples of the image-capture device 108 may include, but are not limited to, an image sensor, a wide-angle camera, a handheld video cam, a traffic camera, a closed-circuit television (CCTV) camera, a body camera (e.g. a police body camera), a dash camera (e.g., a dash camera on-board a police vehicle), an in-vehicle camera, a 360 degree camera, a Camera-Serial Interface (CSI) camera, an action camera, a camcorder, a digital camera, camera phones, a time-of-flight camera (ToF camera), a night-vision camera, and/or other image capture devices.

In an embodiment, the first vehicle 104 may include a linear and/or rotary actuator, onto which the image-capture device 108 may be mounted. Based on a human input or an instruction from the electronic apparatus 102, the image-capture device 108 may be rotated or moved to face traffic in different directions. In another embodiment, the image-capture device 108 may be integrated as part of a digital rear-view mirror or a digital side-view mirror of the second vehicle 106. In another embodiment, the image-capture device 108 may be a 360-degree camera mounted on the roof of the second vehicle 106 to cover a 360-degree FOV of a surrounding environment.

The DNN 110 may be referred to as a computational network or a system of artificial neurons, where each layer of the DNN 110 may include artificial neurons as nodes. Outputs of all the nodes in the DNN 110 may be coupled to at least one node of preceding or succeeding layer(s) of the DNN 110. Similarly, inputs of all the nodes in the DNN 110 may be coupled to at least one node of preceding or succeeding layer(s) of the DNN 110. Node(s) in a final layer of the DNN 110 may receive inputs from at least one previous layer. A number of layers and a number of nodes in each layer may be determined from a network topology and certain hyper-parameters of the DNN 110. Such hyper-parameters may be set before or while training the DNN 110 on a training dataset of image frames.

Each node in the DNN 110 may correspond to a mathematical function with a set of parameters, tunable when the DNN 110 is trained. These parameters may include, for example, a weight parameter, a regularization parameter, and the like. Each node may use the mathematical function to compute an output based on one or more inputs from nodes in other layer(s) (e.g., previous layer(s)) of the DNN 110. Examples of the DNN 110 may include, but are not limited to, a convolutional neural network (CNN), a fully convolutional network (FCN), a long-short term memory (LSTM)-CNN hybrid network, Regions with CNN (R-CNN), Fast R-CNN, Faster R-CNN, a You Only Look Once (YOLO) network, a Residual Neural Network (ResNet), a Feature Pyramid Network (FPN), a Retina-Net, a Single Shot Detector (SSD), and/or a variant thereof.

In an embodiment, the DNN 110 may include electronic data, which may be implemented as, for example, a software component of an application executable on the electronic apparatus 102. The DNN 110 may rely on libraries, external scripts, or other logic/instructions for execution by a processing device, such as the electronic apparatus 102. Additionally, or alternatively, the DNN 110 may be implemented using hardware, such as a processor, a co-processor (such as an inference accelerator chip), a microprocessor (e.g., to perform or control performance of one or more operations), a field-programmable gate array (FPGA), or an application-specific integrated circuit (ASIC). In some embodiments, the DNN 110 may be implemented using a combination of both the hardware and the software program.

In training of the DNN 110, one or more parameters of each node of the DNN 110 may be updated based on whether an output of the final layer for a given input (e.g., a training dataset of cropped license plate images) matches a correct result based on a loss function for the DNN 110. The above process may be repeated for the same or a different input till a minima of loss function is achieved, and a training error is minimized. Several methods for training are known in the art, for example, gradient descent, stochastic gradient descent, batch gradient descent, gradient boost, meta-heuristics, and the like.

Once trained, the DNN 110 may be configured to be deployed on the electronic apparatus 102. The DNN 110 may be trained for a License Plate Detection (LPD) task and/or a License Plate Recognition (LPR) task to detect license plates in images and/or to recognize the license plate numbers on such license plates, respectively.

The media device 112 may include suitable logic, circuitry, and interfaces that may be configured to output a notification indicative of a traffic speed violation by the second vehicle 106. The notification may be an audible notification, a viewable notification, a haptic feedback, or a combination thereof. The media device 112 may be an in-vehicle electronic system of the first vehicle 104 or may be a mobile device of a passenger/driver of the first vehicle 104. Examples of the media device 112 may include, but are not limited to, a police mobile data terminal (MDT), a display of a vehicle tracking computer, a display device, a multi-information display (MID), an in-vehicle infotainment system, a heads-up display (HUD), a headphone, a police radio, a speaker, a haptic feedback device, an Augmented Reality headset, a wireless speaker, a smartphone, a cellular phone, a mobile phone, or any computing device with a capability of audio and/or notification display.

The communication network 114 may include a communication medium through which the electronic apparatus 102, the image-capture device 108, and the media device 112 may communicate with each other. Examples of the communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In some embodiments, the communication network 114 may be an in-vehicle network or a peer-to-peer vehicle-to-everything (V2X) network. The communication network 114 may rely of vehicle communication protocols and standards to communication with different in-vehicle electronics or devices (such as other vehicles or roadside units) in a communication range of the first vehicle 104.

In operation, the electronic apparatus 102 may control the image-capture device 108 to capture the sequence of images 116 of the second vehicle 106. The sequence of images 116 may be captured while the first vehicle 104 is on patrol around a zone (an area) to check for traffic violations and the second vehicle 106 is in the FOV of the image-capture device 108. Once the sequence of images 116 is captured, the image-capture device 108 may transfer the captured sequence of images 116 to the electronic apparatus 102. In case the electronic apparatus 102 is installed in the first vehicle 104, the sequence of images 116 may be transferred wirelessly or wired through a suitable camera interface or an in-vehicle communication network. In case the electronic apparatus 102 is a remote computing device, the sequence of images 116 may be transferred via the communication network 114.

The electronic apparatus 102 may receive the captured sequence of images 116 and may detect a license plate 118 of the second vehicle 106 in each image of the received sequence of images 116. In an embodiment, the electronic apparatus 102 may input the sequence of images 116 to the DNN 110. The DNN 110 may sequentially receive each of the input sequence of images 116 as an input through an input layer of the DNN 110 and may output a sequence of LPD results. Each LPD result in the output sequence of LPD results may correspond to an image in the input sequence of images 116. Each LPD result may include, for example, bounding box coordinates and an LPD confidence score. For each input image, the bounding box coordinates (bx, by, bw, bh) may define a window portion of the respective input image in which the license plate 118 of the second vehicle 106 is detected. The LPD confidence score may be a soft label (i.e. between 0 and 1) or a hard label (i.e. 0 or 1). If the LPD confidence score is above a threshold (for example, above 0.995), then the likelihood of the license plate 118 within the bounding box coordinates is high. If the LPD confidence score is below the threshold (for example, below 0.995), then the likelihood of the license plate 118 within the bounding box coordinates is low (with a degree to uncertainty).

In another embodiment, the DNN 110 may output a sequence of LPR results, where each LPR result may correspond to an image in the input sequence of images 116. Each LPR result may include a license plate number of the second vehicle 106 and an LPR confidence score indicative of a confidence of the DNN 110 in the recognition of the license plate number. Similar to LPD confidence score, the LPR confidence score may be a soft label (i.e. between 0 and 1) or a hard label (i.e. 0 or 1). The LPR confidence score may be a single value for the entire license plate number or may be a vector of confidence scores, where each element of the vector includes a confidence score for one of the characters of the license plate number. If the LPR confidence score is high (i.e. close to 1), then the recognition accuracy of the license plate number within the bounding box coordinates is high. If the LPR confidence score is low (i.e. close to 0), then the recognition accuracy of the license plate number within the bounding box coordinates is low (with a degree to uncertainty).

The electronic apparatus 102 may extract the sequence of LPD results as the output of the DNN 110 for the input sequence of images 116 and may detect the license plate 118 of the second vehicle 106 in each image of the input sequence of images 116 based on the extracted sequence of LPD results. From the input sequence of images 116, the electronic apparatus 102 may extract a set of license plate images 120, each of which may correspond to the detected license plate 118. For example, the electronic apparatus 102 may select a set of images from the input sequence of images 116. From each of the selected set of images, the set of license plate images 120 may be extracted by cropping a region of interest (ROI) which lies within the bounding box coordinates, as included in a respective LPD result of the extracted sequence of LPD results.

The extracted set of license plate images 120 may include at least two images, such as a first license plate image 120A and a second license plate image 120B. The electronic apparatus 102 may determine a first change in a size of the first license plate image 120A with respect to a size of the second license plate image 120B. The determined change may correspond to an increase or a decrease in the size of the first license plate image 120A with respect to the size of the second license plate image 120B.

The electronic apparatus 102 may also determine the speed of the first vehicle 104. For example, the determined speed may be an instantaneous speed corresponding to a time at which one or more images of the input sequence of images 116 is captured. The electronic apparatus 102 may further determine a traffic speed violation by the second vehicle 106 based on the determined first change and the determined speed of the first vehicle 104. For example, if the determined speed of the first vehicle 104 is equal to a maximum legal speed limit (e.g., 50 miles per hours), then it may be checked whether the determined first change corresponds to an increase or a decrease in the size of the first license plate image 120A with respect to the size of the second license plate image 120B. If the first license plate image 120A precedes the second license plate image 120B and the size of the first license plate image 120A is determined to be smaller than the second license plate image 120B, then the relative speed of the second vehicle 106 may be more than that of the first vehicle 104. In such a case, it may be determined that the second vehicle 106 may have committed the traffic speed violation as the relative speed of the second vehicle 106 exceeds the maximum legal speed limit. Thereafter, the electronic apparatus 102 may control the media device 112 to output a notification which may be indicative of the determined traffic speed violation by the second vehicle 106.

Figure 2:
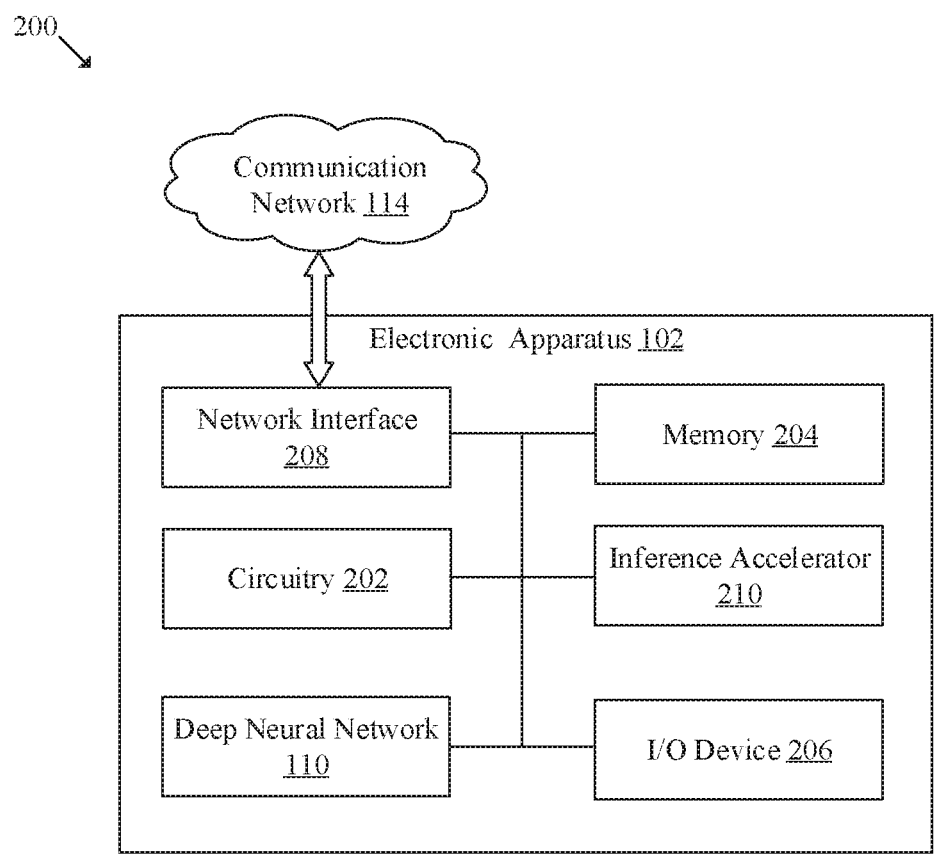
FIG. 2 is an exemplary block diagram of the electronic apparatus of FIG. 1, in accordance with an embodiment of the disclosure.

FIG. 2 is an exemplary block diagram of the electronic apparatus of FIG. 1, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, and a network interface 208. In some embodiments, the electronic apparatus 102 may include an inference accelerator 210 to accelerate operations associated with the DNN 110. In such an implementation, the DNN 110 may rely on storage and computing resources of the memory 204 and the inference accelerator 210.

The circuitry 202 may be communicatively coupled to the memory 204, the I/O device 206, the network interface 208, and the inference accelerator 210. In at least one embodiment, the electronic apparatus 102 may include provisions to capture images/videos via the image-capture device 108 and to allow the user to view the captured images/videos and/or apply certain operations on the captured images/videos.

The circuitry 202 may include suitable logic, circuitry, interfaces, and/or code that may be configured to execute program instructions associated with different operations to be executed by the electronic apparatus 102. For example, one or more of such operations may be executed to determine to determine whether the second vehicle 106 violates the defined legal maximum or minimum speed set by the government/authorities for a particular geo-zone or a road. The circuitry 202 may be implemented based on a number of processor technologies known in the art. Examples of implementations of the circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

The memory 204 may include suitable logic, circuitry, and/or interfaces that may be configured to store the program instructions executable by the circuitry 202. Additionally, the memory 204 may store defined speed limits for various zones or a network of various roads and highways. In at least one embodiment, the memory 204 may store the DNN 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O channel/interface between the electronic apparatus 102 and a user of the electronic apparatus 102. The I/O device 206 may include various input and output devices, which may be configured to communicate with different operational components of the electronic apparatus 102. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to connect and communicate with a plurality of electronic devices, such as a computer, a smartphone, or a server. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 210 may include suitable logic, circuitry, interfaces, and/or code that may be configured to operate as a co-processor for the circuitry 202 to accelerate computations associated with the operations of the DNN 110 for the LPD task and/or the LPR task. The inference accelerator 210 may accelerate the computations on the electronic apparatus 102 such that the sequence of LPD results or the sequence of LPR results is generated in less time than what is typically incurred without the use of the inference accelerator 210. The inference accelerator 210 may implement various acceleration techniques, such as parallelization of some or all of the operations of the DNN 110. The inference accelerator 210 may be implemented as a software, a hardware, or a combination thereof. Example implementations of the inference accelerator 210 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

The functions or operations executed by the electronic apparatus 102, as described in FIG. 1, may be performed by the circuitry 202. Operations executed by the circuitry 202 are described in detail, for example, in FIG. 3 and FIG. 4.

Figure 3:
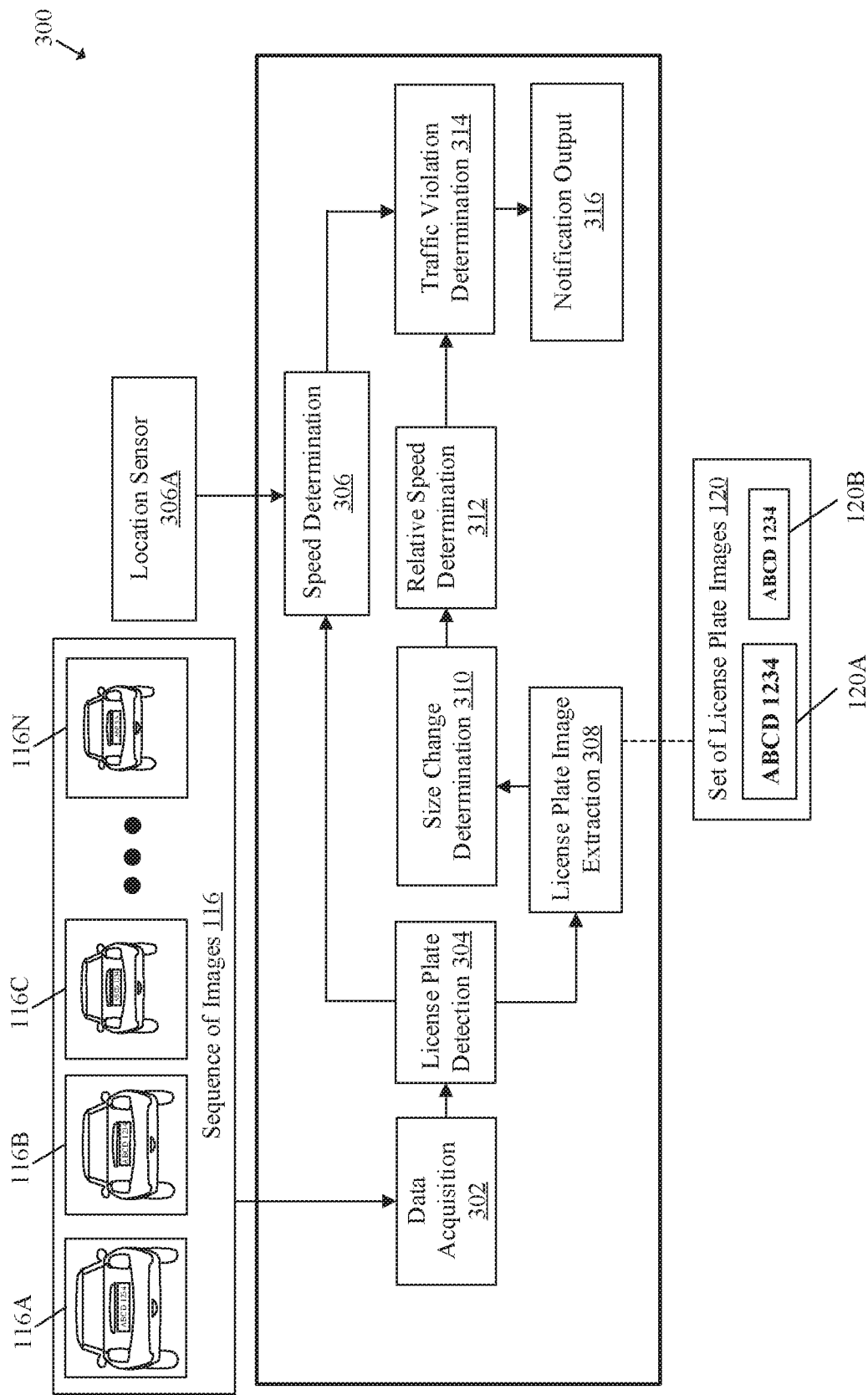
FIG. 3 is a diagram that illustrates exemplary operations for traffic speed enforcement based on license plate detection, in accordance with an embodiment of the disclosure.

FIG. 3 is a diagram that illustrates exemplary operations for traffic speed enforcement based on license plate detection, in accordance with an embodiment of the disclosure.

FIG. 3 is explained in conjunction with elements from FIG. 1 and FIG. 2. With reference to FIG. 3, there is shown a block diagram 300 that illustrates exemplary operations from 302 to 316, as described herein. The exemplary operations illustrated in the block diagram 300 may start at 302 and may be performed by any computing system, apparatus, or device, such as by the electronic apparatus 102 of FIG. 1 or FIG. 2. Although illustrated with discrete blocks, the exemplary operations associated with one or more blocks of the block diagram 300 may be divided into additional blocks, combined into fewer blocks, or eliminated, depending on the particular implementation.

At 302, data acquisition may be performed. For data acquisition, the circuitry 202 may control the image-capture device 108 to capture the sequence of images 116 of the second vehicle 106. The image-capture device 108 may be calibrated to include the license plate 118 of the second vehicle 106 is the FOV of the image-capture device 108. As shown, the captured sequence of images 116 include a first image 116A, the second image 116B, the third image 116C, and the Nth image 116N. Once captured, the image-capture device 108 may transfer the captured sequence of images 116 to the electronic apparatus 102.

At 304, license plate detection (LPD) may be performed. The circuitry 202 may detect the license plate 118 of the second vehicle 106 in each of the captured sequence of images 116. In an embodiment, the circuitry 202 may input the captured sequence of images 116 to the DNN 110. The DNN 110 may be an automatic license plate recognition (ALPR) network that may be pre-trained on the LPD task and/or the LPR task. The DNN 110 may sequentially receive each of the input sequence of images 116 as an input and may output a sequence of LPD results. Each LPD result in the output sequence of LPD results may correspond to an image in the input sequence of images 116. Each LP result may include, for example, bounding box coordinates and an LPD confidence score. For each input image, the bounding box coordinates (bx, by, bw, bh) may define a window portion of the respective input image in which the license plate 118 of the second vehicle 106 is detected. The LPD confidence score may be a soft label (i.e. between 0 and 1) or a hard label (i.e. 0 or 1). If the LPD confidence score is greater than a threshold (for example, above 0.995), then the likelihood of the license plate 118 within the bounding box coordinates is high. If the LPD confidence score is below the threshold (for example, below 0.995), then the likelihood of the license plate 118 within the bounding box coordinates is low (with a degree to uncertainty).

In another embodiment, the DNN 110 may output a sequence of LPR results, where each LPR result may correspond to an image in the input sequence of images 116. Each LPR result may include a license plate number of the second vehicle 106 and an LPR confidence score indicative of a confidence of the DNN 110 in the recognition of the license plate number. Similar to the LPD confidence score, the LPR confidence score may be a soft label (i.e. between 0 and 1) or a hard label (i.e. 0 or 1). The LPR confidence score may be a single value for the entire license plate number or may be a vector of confidence scores, where each element of the vector includes a confidence score for one of the characters of the license plate number. If the LPD confidence score is greater than a threshold (for example, above 0.995), then the likelihood of the license plate 118 within the bounding box coordinates is high. If the LPD confidence score is below the threshold (for example, below 0.995), then the likelihood of the license plate 118 within the bounding box coordinates is low (with a degree to uncertainty).

The circuitry 202 may extract the sequence of LPD results as an output of the DNN 110 for the input sequence of images 116 and may detect the license plate 118 based on the extracted sequence of LPD results. In an embodiment, the circuitry 202 may also extract the sequence of LPR results, based on which the license plate number of the second vehicle 106 may be recognized in the input sequence of images 116.

At 306, a speed of the first vehicle 104 may be determined. The circuitry 202 may determine the speed of the first vehicle 104 and may log the determined speed in the memory 204. The memory 204 may also store records which include a timestamp at which the determined speed is logged in the memory 204. In some embodiments, the determined speed of the first vehicle 104 may be equal to a defined speed limit for a road or a zone where the first vehicle 104 is present. The defined speed limit may be a legal maximum speed or a legal minimum speed at which the first vehicle 104 or the second vehicle 106 is allowed to move on the road or the zone.

In an embodiment, the circuitry 202 may receive location information associated with the first vehicle 104 and may determine the speed of the first vehicle 104 based on the received location information. The location information may be received via a location sensor 306A installed in the first vehicle 104 and may include a sequence of location values of the first vehicle 104 at regular time intervals. Examples of the location sensor 306A may include, but are not limited to, a Global Navigation Satellite System (GNSS) receiver, an inertial measurement unit, an accelerometer, a gyroscope, a mobile network-based locator (such as a Subscriber Identity Module), and/or a combination thereof. In another embodiment, the circuitry 202 may determine the speed of the first vehicle 104 through a vehicle speed sensor (VSS). The VSS may be positioned, for example, between the axle and the wheel of the first vehicle 104.

At 308, license plate image extraction may be performed. In an embodiment, before the extraction, the circuitry 202 may select a set of images from the captured sequence of images 116. The selected set of images may correspond to a capture-time at which the speed (determined at 306) of the first vehicle 104 is equal to the defined speed limit. Herein, the defined speed limit may be a legal maximum speed or a legal minimum speed at which the first vehicle 104 or the second vehicle 106 is allowed to move on the road or the zone.

By way of example, and not limitation, the sequence of images 116 may be captured over a duration of 10 seconds in which the speed of the first vehicle 104 may increase from 40 miles per hour (mph) at $1^{st}$ second to a legal maximum speed (i.e. the defined speed limit) of 50 mph at $8^{th}$ second. In such a case, the circuitry 202 may select from the sequence of images 116, a set of images which may be captured at the $8^{th}$ second. By way of another example, and not limitation, the sequence of images 116 may be captured over a duration of 10 seconds in which the speed of the first vehicle 104 may increase from 5 miles per hour (mph) at $1^{st}$ second to a legal minimum speed (i.e. the defined speed limit) of 10 mph at $7^{th}$ second. In such a case, the circuitry 202 may select, from the sequence of images 116, a set of images which may be captured at the $7^{th}$ second.

The circuitry 202 may extract the set of license plate images 120 from the selected set of images. Such extraction may be based on the extracted sequence of LPD results. For example, from the selected set of images, each license plate image may be extracted by cropping an ROI which lies within the bounding box coordinates, as included in a respective LPD result in the output sequence of LPD results. The extracted set of license plate images 120 may include, for example, the first license plate image 120A and the second license plate image 120B. The first license plate image 120A and the second license plate image 120B may be extracted from the first image 116A and the second image 116B, respectively.

For the selected set of images, the speed of the first vehicle 104 may be assumed to be equal (or approximately equal) to the defined speed limit. Thus, any difference or change in size (in pixels) of two successive license plate images may help to determine if the relative speed of the second vehicle 106 is more than the defined speed limit.

At 310, a size change may be determined from the extracted set of license plate images 120. The circuitry 202 may determine a first change in a size of the first license plate image 120A with respect to a size of the second license plate image 120B. Herein, the first license plate image 120A may be considered to precede the second license plate image 120B in time. The determined first change may correspond to an increase or a decrease in the size of the first license plate image 120A with respect to the size of the second license plate image 120B.

In another embodiment, the circuitry 202 may determine a second change in a font-size of a license plate number on the first license plate image 120A with respect to a font-size of the license plate number on the second license plate image 120B. The second change may be determined (in pixels) based on a sequence of LPR results, which may be extracted as an output of the DNN 110 for the input sequence of images 116. Also, the determined second change may correspond to an increase or a decrease in the font-size of the license plate number on the first license plate image 120A with respect to the font-size of the license plate number on the second license plate image 120B.

At 312, a relative speed of the second vehicle 106 may be determined. In an embodiment, the circuitry 202 may determine the relative speed of the second vehicle 106 with respect to the speed (determined at 306) of the first vehicle 104 based on the determined first change. Additionally, or alternatively, the relative speed of the second vehicle 106 with respect to the speed of the first vehicle 104 may be determined based on the determined second change. While determining the relative speed of the first vehicle 104, the speed of the first vehicle 104 may be considered to be equal (or approximately equal) to the defined speed limit.

At 314, a traffic speed violation may be determined. The second vehicle 106 may violate the defined speed limit if the relative speed of the second vehicle 106 is greater than a legal maximum speed or less than a legal minimum speed for a zone in which the second vehicle 106 is present.

In an embodiment, the circuitry 202 may determine the traffic speed violation by the second vehicle 106 based on a determination that the determined relative speed (at 312) indicates that an absolute speed of the second vehicle 106 is greater than the defined speed limit. In this case, the defined speed limit may be a legal maximum speed at which the first vehicle 104 or the second vehicle 106 is allowed to move on a road (within the zone).

In another embodiment, the circuitry 202 may determine the traffic speed violation by the second vehicle 106 based on a determination that the determined relative speed (at 312) indicates that the absolute speed of the second vehicle 106 is less than the defined speed limit. In this case, the defined speed limit may be a legal minimum speed at which the first vehicle 104 or the second vehicle 106 is allowed to move on road (within the road).

By way of example, and not limitation, within a duration in which the selected set of images is captured, if the speed of the first vehicle 104 is relatively constant and approximately equal to the defined speed limit, then an increase in the size of the second license plate image 120B with respect to that of the first license plate image 120A may indicate that the first vehicle 104 may have moved closer to the second vehicle 106. For the first vehicle 104 to move closer to the second vehicle 106, the absolute speed of the second vehicle 106 must be less than the speed (which approximately equals the defined speed limit) of the first vehicle 104. Similarly, if the speed of the first vehicle 104 is relatively constant and approximately equal to the defined speed limit, then a decrease in the size of the second license plate image 120B with respect to that of the first license plate image 120A may indicate that the second vehicle 106 may have moved farther away from the first vehicle 104. For the first vehicle 104 to move farther away from the second vehicle 106, the absolute speed of the second vehicle 106 must be more than the speed (which approximately equals the defined speed limit) of the first vehicle 104.

In order to ascertain if the second vehicle 106 violates a maximum legal speed, it may be determined whether the size of the second license plate image 120B decreases with respect to that of the first license plate image 120A. In case of a decrease, the second vehicle 106 may cause a traffic speed violation as the speed of the second vehicle 106 may be more than the maximum legal speed (i.e. the defined speed limit). Whereas, to ascertain if the second vehicle 106 violates a minimum legal speed, it may be determined whether the size of the second license plate image 120B increases with respect to that of the first license plate image 120A. In case of an increase, the second vehicle 106 may cause a traffic speed violation as the speed of the second vehicle 106 may be below the minimum legal speed (i.e. the defined speed limit).

By way of another example, and not limitation, within a duration in which the selected set of images is captured, if the speed of the first vehicle 104 is constant and equal (or approximately equal) to the defined speed limit, then an increase in the font-size of the license plate number on the second license plate image 120B with respect to that on the first license plate image 120A may indicate that the first vehicle 104 may have moved closer to the second vehicle 106. For the first vehicle 104 to move closer to the second vehicle 106, the absolute speed of the second vehicle 106 must be less than the speed (which approximately equals the defined speed limit) of the first vehicle 104. Similarly, if the speed of the first vehicle 104 is constant and equal (or approximately equal) to the defined speed limit, then a decrease in the font-size of the license plate number on the second license plate image 120B with respect to that on the first license plate image 120A may indicate that the second vehicle 106 may have moved further away from the first vehicle 104. For the second vehicle 106 to move further away from the first vehicle 104, the absolute speed of the second vehicle 106 must be more than the speed (which approximately equals the defined speed limit) of the first vehicle 104.

In order to ascertain if the second vehicle 106 violates a maximum legal speed, it may be determined whether the font-size of the license plate number on the second license plate image 120B decreases with respect to that on the first license plate image 120A. In case of a decrease, the second vehicle 106 may cause a traffic speed violation as the speed of the second vehicle 106 may be more than the maximum legal speed (i.e. the defined speed limit). Whereas, to ascertain if the second vehicle 106 violates a minimum legal speed, it may be determined whether the font-size of the license plate number on the second license plate image 120B increases with respect to that on the first license plate image 120A. In case of an increase, the second vehicle 106 may cause a traffic speed violation as the speed of the second vehicle 106 may be below the minimum legal speed (i.e. the defined speed limit).

At 316, a notification may be presented via the media device 112. The circuitry 202 may control the media device 112 to output the notification that may be indicative of the traffic speed violation by the second vehicle 106. The notification may be a visual notification, an audible notification, or a combination of the visual notification, the audible notification, and other feedback-mechanisms, such as a haptic feedback. For example, the notification may include a go-slow or a go-fast indicator for the second vehicle 106. Alternatively, the notification may include a message, such as "The vehicle with the license plate number "ABCD 1234" is over speeding".

Figure 4:
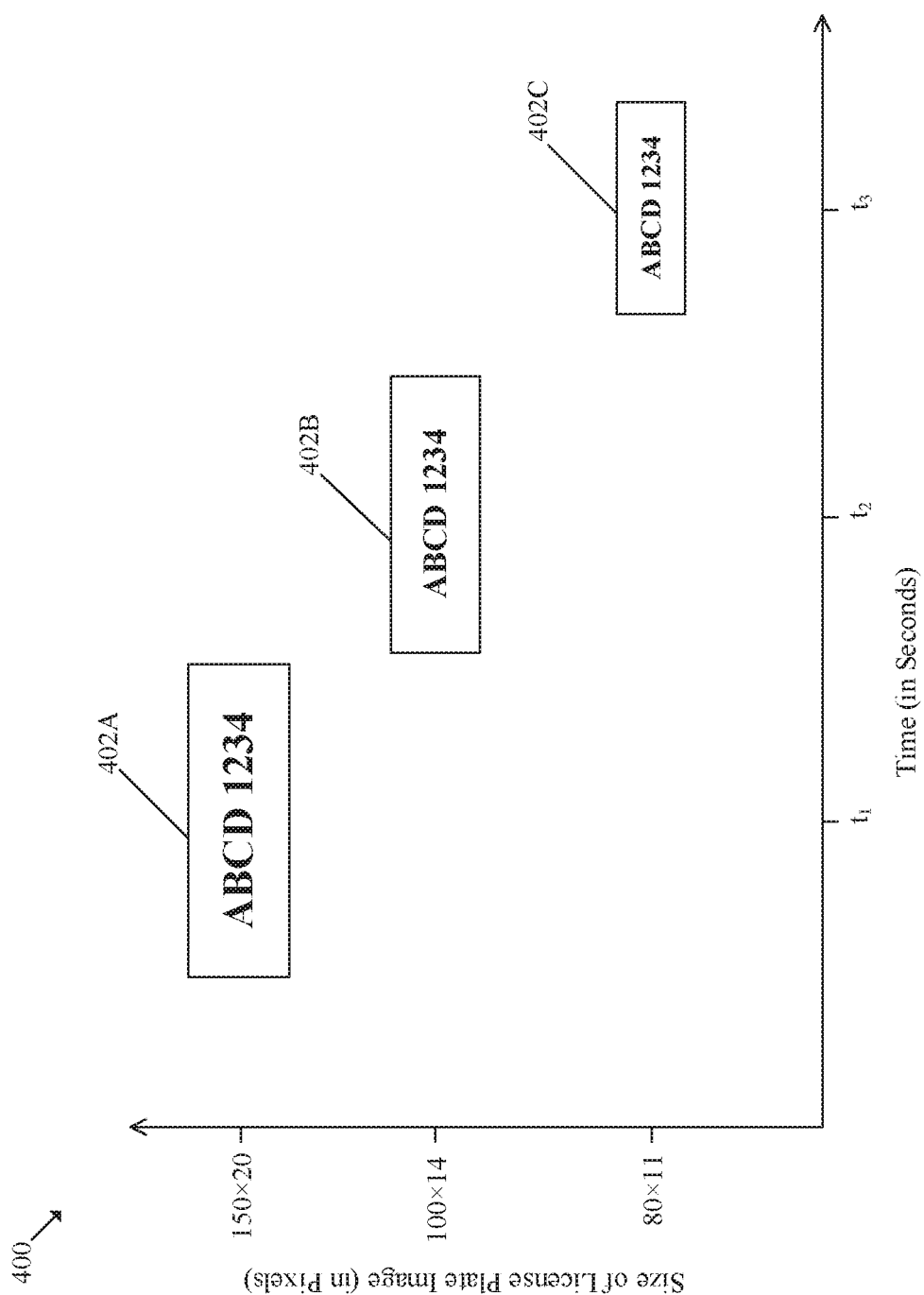
FIG. 4 is a graph that illustrates an exemplary variation in size of license plate images at different time-instants, in accordance with an embodiment of the disclosure.

FIG. 4 is a graph that illustrates an exemplary variation in size of license plate images at different time-instants, in accordance with an embodiment of the disclosure. FIG. 4 is explained in conjunction with elements from FIGS. 1, 2, and 3. With reference to FIG. 4, there is shown a graph 400 which represents a variation in a size of each of a set of license plate images of the second vehicle 106 over a period of time. In the graph 400, there is shown a set of license plate images, such as a first license plate image 402A, a second license plate image 402B, and a third license plate image 402C. The first license plate image 402A may be extracted from a first image (captured at time t1) of a sequence of images (such as the sequence of images 116) based on an LPD result of the DNN 110 for the first image as input to the DNN 110. Similarly, the second license plate image 402B and the third license plate image 402C may be extracted from a second image (captured at time t2) and a third image (captured at time t3), respectively based respective LPDs results of the DNN 110 for the second image and the third image as respective inputs to the DNN 110. Each of the first image, the second image, and the third image may correspond to a capture-time at which the speed of the first vehicle 104 may be equal (or approximately equal) to the defined speed limit.

In some embodiments, the circuitry 202 may determine the first change in the length of the first license plate image 402A with respect to the length of the second license plate image 402B. In some other embodiments, the circuitry 202 may determine the first change in the width of the first license plate image 402A with respect to that of the second license plate image 402B. In some other embodiment, the circuitry 202 may determine the first change in both the length and the width of the first license plate image 402A with respect to that of the second license plate image 402B.

In the graph 400, the length of the first license plate image 402A, the second license plate image 402B, and the third license plate image 402C is shown as 150 pixels, 100 pixels, and 80 pixels, respectively. By way of example, and not limitation, the first change may be determined as a difference (−50 pixels) between the length (100 pixels) of the second license plate image 402B and the length (150 pixels) of the first license plate image 402A. By way of another example, and not limitation, the first change may be determined as a ratio (0.67) of the length (100 pixels) of the second license plate image 402B to the length (150 pixels) of the first license plate image 402A. If the ratio is more than 1 or the difference is more than 0 pixels, then the first change may indicate that the relative speed of the second vehicle 106 is less than the speed of the first vehicle 104. In this case, the ratio is less than 1 or the difference is negative (in pixels). Thus, the first change indicates that the relative speed of the second vehicle 106 is more than the speed of the first vehicle 104.

The circuitry 202 may determine the traffic speed violation by the second vehicle 106 based on the determined first change and the determined speed of the first vehicle 104. For example, If the speed of the first vehicle 104 is equal (or approximately equal) to the defined speed limit, then the ratio of more than 1 (or the difference of more than 0 pixels) may imply that the absolute speed of the second vehicle 106 is below the defined speed limit. In this case, the speed of the first vehicle 104 is equal (or approximately equal) to the defined speed limit and the ratio (0.67) is less than 1 (or the difference is less than 0 pixels). Thus, the absolute speed of the second vehicle 106 may be above the defined speed limit and the second vehicle 106 may be determined to have a traffic speed violation (such as over-speeding beyond the legal maximum speed).

In an embodiment, the circuitry 202 may determine a second change in a font-size of a license plate number on the first license plate image 402A with respect to a font-size of the license plate number on the second license plate image 402B. The circuitry 202 may determine the traffic speed violation by the second vehicle 106 based on the determined second change and the determined speed of the first vehicle 104.

For example, the second change may be determined in terms of a ratio (1.25) of the font-size (10 pixels) of the license plate number on the second license plate image 402B with respect to the font-size (8 pixels) of the license plate number on the first license plate image 402A. If the ratio (1.25) is more than 1, then the relative speed of the second vehicle 106 may be less than the speed of the first vehicle 104. If the speed of the first vehicle 104 is equal (or approximately equal) to the defined speed limit, then the speed of the second vehicle 106 may be below the defined speed limit. Whereas, if the ratio is less than 1, then the relative speed of the second vehicle 106 may be more than the speed of the first vehicle 104. In case the speed of the second vehicle 106 is determined to be above the defined speed limit, the second vehicle 106 may be determined to have caused a traffic speed violation (such as over-speeding beyond the legal maximum speed).

Figure 5:
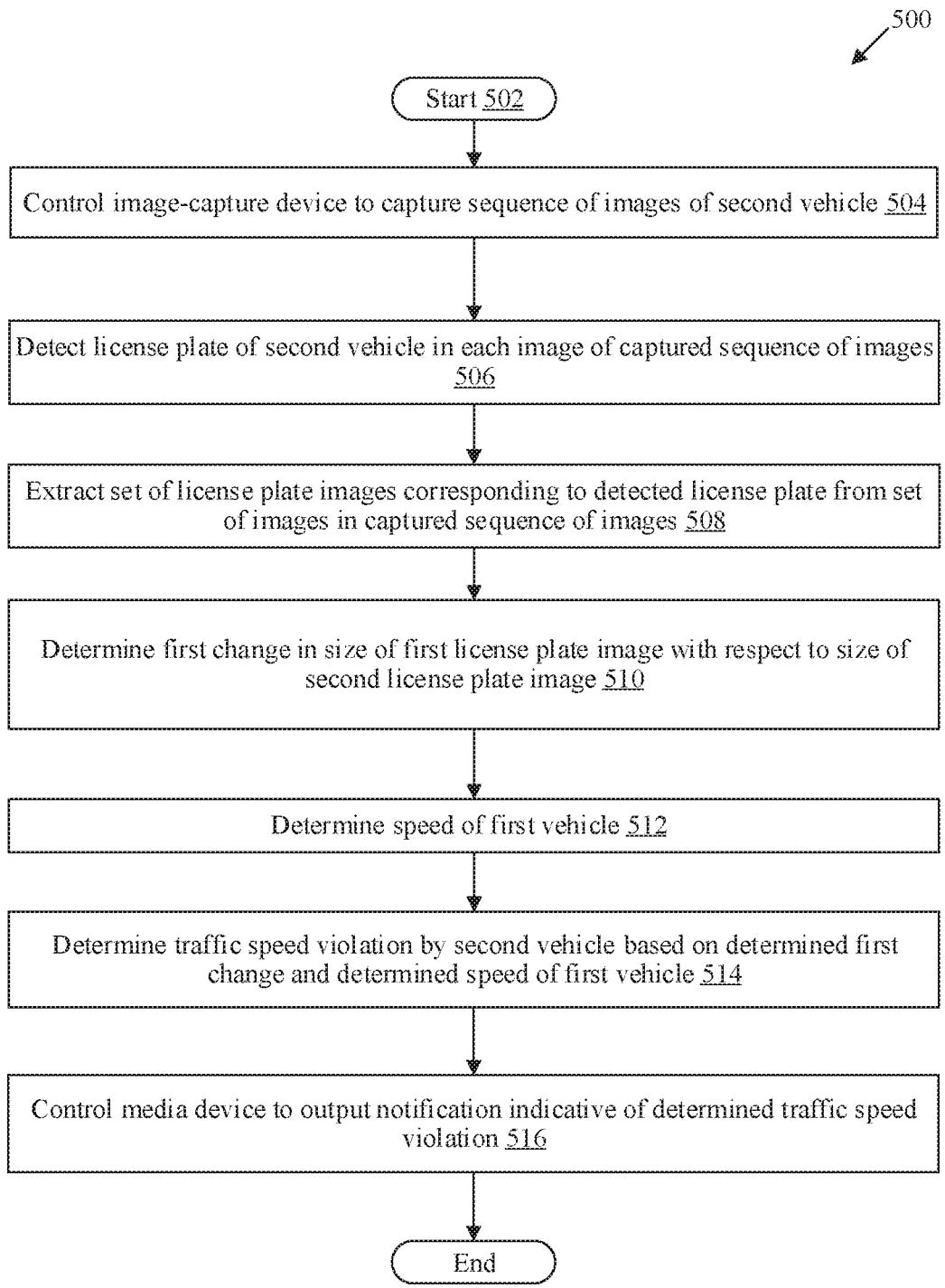
FIG. 5 is a flowchart that illustrates an exemplary method for speed enforcement based on license plate detection, in accordance with an embodiment of the disclosure.

FIG. 5 is a flowchart that illustrates an exemplary method for traffic speed enforcement based on license plate detection, in accordance with an embodiment of the disclosure. With reference to FIG. 5, there is shown a flowchart 500. The operations of the exemplary method may be executed by any computing system, for example, by the electronic apparatus 102 of FIG. 1 or FIG. 2. The operations of the flowchart 500 may start at 502 and may proceed to 504.

At 504, the image-capture device 108 may be controlled to capture the sequence of images 116 of the second vehicle 106. In at least one embodiment, the circuitry 202 may control the image-capture device 108 to capture the sequence of images 116 of the second vehicle 106.

At 506, the license plate 118 of the second vehicle 106 may be detected in each image of the captured sequence of images 116. In at least one embodiment, the circuitry 202 may detect the license plate 118 of the second vehicle 106 in each image of the captured sequence of images 116.

At 508, the set of license plate images 120 corresponding to the detected license plate 118 may be extracted from a set of images of the captured sequence of images 116. In at least one embodiment, the circuitry 202 may extract the set of license plate images 120 corresponding to the detected license plate 118 from the set of images in the captured sequence of images 116.

At 510, a first change in the size of first license plate image 120A with respect to the size of the second license plate image 120B may be determined. In at least one embodiment, the circuitry 202 may determine the first change in the size of the first license plate image 120A with respect to the size of the second license plate image 120B.

At 512, a speed of the first vehicle 104 may be determined. In at least one embodiment, the circuitry 202 may determine the speed of the first vehicle 104.

At 514, a traffic speed violation by the second vehicle 106 may be determined. The traffic speed violation may be determined based on the determined first change and the determined speed of the first vehicle 104. In at least one embodiment, the circuitry 202 may determine the traffic speed violation by the second vehicle 106 based on the determined first change and the determined speed of the first vehicle 104.

At 516, the media device 112 may be controlled to output a notification indicative of the determined traffic speed violation. In at least one embodiment, the circuitry 202 may control the media device 112 to output the notification indicative of the determined traffic speed violation. Control may pass to end.

Various embodiments of the disclosure may provide a non-transitory computer readable medium and/or storage medium having stored thereon, instructions executable by a machine and/or a computer to operate an electronic apparatus (e.g., the electronic apparatus 102) for traffic speed enforcement based on license plate detection. The instructions may cause the machine and/or computer to perform operations that include controlling an image-capture device (e.g., the image-capture device 108), installed in a first vehicle (e.g., the first vehicle 104), to capture a sequence of images (e.g., the sequence of images 116) of a second vehicle (e.g., the second vehicle 106). The operations further include detecting a license plate (e.g., the license plate 118) of the second vehicle in each image of the captured sequence of images. The operations further include extracting the set of license plate images (e.g., the set of license plate images 120) corresponding to the detected license plate from a set of images in the captured sequence of images. The operations further include determining a first change in a size of a first license plate image of the extracted set of license plate images with respect to a size of a second license plate image of the extracted set of license plate images. The operations further include determining a speed of the first vehicle and further determining a traffic speed violation by the second vehicle based on the determined first change and the determined speed of the first vehicle. The operations further include controlling a media device (e.g., the media device 112) to output a notification indicative of the determined traffic speed violation.

Certain embodiments of the disclosure may be found in an electronic apparatus and a method for traffic speed enforcement based on license plate detection. Various embodiments of the disclosure may provide the electronic apparatus 102 (FIG. 1) that may include the circuitry 202 (FIG. 2) communicatively coupled to the image-capture device 108 (FIG. 1) installed in the first vehicle 104 (FIG. 1). The circuitry 202 may be configured to control the image-capture device 108 to capture the sequence of images 116 of the second vehicle 106. The circuitry 202 may be configured to receive location information associated with the first vehicle 104 via the location sensor 306A and determine the speed of the first vehicle 104 based on the received location information.

The circuitry 202 may be further configured to detect the license plate 118 of the second vehicle 106 in each image of the captured sequence of images 116. The circuitry 202 may be further configured to input the captured sequence of images 116 to the Deep Neural Network (DNN) 110 trained on a license plate detection (LPD) task. The circuitry 202 may be further configured to extract a sequence of LPD results as an output of the DNN 110 for the input sequence of images 116. The circuitry 202 may be configured to detect the license plate 118 of the second vehicle 106 in each image of the captured sequence of images 116 based on the extracted sequence of LPD results.

In at least one embodiment, the circuitry 202 may be further configured select a set of images from the captured sequence of images 116. The selected set of images may correspond to a capture-time at which the speed of the first vehicle 104 may be equal to a defined speed limit. In such a case, the set of license plate images 120 may be extracted from the selected set of images.

In accordance with an embodiment, the speed of the first vehicle 104 may be equal to the defined speed limit. The defined speed limit may be a legal maximum speed or a legal minimum speed at which the first vehicle 104 or the second vehicle 106 may be allowed to move on a road.

In accordance with an embodiment, the circuitry 202 may be further configured to determine a first change in a size of the first license plate image 120A of the extracted set of license plate images 120 with respect to a size of the second license plate image 120B of the extracted set of license plate images 120. The determined first change may correspond to an increase or a decrease in the size of the first license plate image 120A with respect to the size of the second license plate image 120B.

In accordance with an embodiment, the circuitry 202 may be further configured to determine a second change in a font-size of a license plate number on the first license plate image 120A with respect to a font-size of the license plate number on the second license plate image 120B. The circuitry 202 may be configured to determine the traffic speed violation by the second vehicle 106 based on the determined second change and the determined speed of the first vehicle 104. The determined second change may correspond to an increase or a decrease in the font-size of the license plate number on the first license plate image 120A with respect to the font-size of the license plate number on the second license plate image 120B.

In accordance with an embodiment, the circuitry 202 may be configured to determine a relative speed of the second vehicle 106 with respect to the determined speed of the first vehicle 104 based on the determined first change or the determined second change.

In accordance with an embodiment, the circuitry 202 may be configured to determine the traffic speed violation by the second vehicle 106 based on a determination that the determined relative speed. The relative speed may indicate that an absolute speed of the second vehicle 106 is greater than the defined speed limit. The defined speed limit may be a legal maximum speed at which the first vehicle 104 or the second vehicle 106 may be allowed to move on the road. The circuitry 202 may be configured to control the media device 112 to output a notification indicative of the determined traffic speed violation.

In accordance with an embodiment, the circuitry 202 may be configured to determine the traffic speed violation by the second vehicle 106 based on a determination that the determined relative speed indicates that the absolute speed of the second vehicle 106 is less than the defined speed limit. The defined speed limit may be a legal minimum speed at which the first vehicle 104 or the second vehicle 106 may be allowed move on the road. The circuitry 202 may be configured to control the media device 112 to output a notification indicative of the determined traffic speed violation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. An electronic apparatus, comprising:
   circuitry communicatively coupled to an image-capture device installed in a first vehicle, wherein the circuitry is configured to:
   control the image-capture device to capture a sequence of images of a second vehicle;
   detect a license plate of the second vehicle in each image of the captured sequence of images;
   determine a time instant at which a speed of the first vehicle, in which the image-capture device is installed, is equal to a defined speed limit;
   select a set of images from the captured sequence of images based on the determined time instant, wherein the selected set of images corresponds to the time instant at which the speed of the first vehicle is equal to the defined speed limit;
   extract, from the selected set of images in the captured sequence of images, a set of license plate images corresponding to the detected license plate;
   determine a first change in a size of a first license plate image of the extracted set of license plate images with respect to a size of a second license plate image of the extracted set of license plate images;
   determine a traffic speed violation by the second vehicle based on the determined first change; and
   control a media device to output a notification indicative of the determined traffic speed violation.

2. The electronic apparatus according to claim 1, wherein the circuitry is further configured to:
   input the captured sequence of images to a Deep Neural Network (DNN) trained on a license plate detection (LPD) task;
   extract a sequence of LPD results as an output of the DNN for the input sequence of images, wherein the output of the DNN comprises bounding box coordinates of the license plate and an LPD confidence score indicating a likelihood of the license plate within the bounding box coordinates; and
   detect the license plate of the second vehicle in each image of the captured sequence of images based on the extracted sequence of LPD results.

3. The electronic apparatus according to claim 1, wherein the defined speed limit is one of a legal maximum speed or a legal minimum speed at which the second vehicle is allowed to move on a road.

4. The electronic apparatus according to claim 1, wherein the circuitry is further configured to determine a relative speed of the second vehicle with respect to the speed of the first vehicle based on the determined first change.

5. The electronic apparatus according to claim 4, wherein the circuitry is further configured to determine the traffic speed violation by the second vehicle based on a determination that the determined relative speed indicates that an absolute speed of the second vehicle is greater than the defined speed limit, and
the defined speed limit is a legal maximum speed at which the second vehicle is allowed to move on a road.

6. The electronic apparatus according to claim 4, wherein the circuitry is further configured to determine the traffic speed violation by the second vehicle based on a determination that the determined relative speed indicates that an absolute speed of the second vehicle is less than the defined speed limit, and
the defined speed limit is a legal minimum speed at which the second vehicle is allowed move on a road.

7. The electronic apparatus according to claim 1, wherein the determined first change corresponds to one of an increase or a decrease in the size of the first license plate image with respect to the size of the second license plate image.

8. The electronic apparatus according to claim 1, wherein the circuitry is further configured to:
   determine a second change in a font-size of a license plate number on the first license plate image with respect to a font-size of the license plate number on the second license plate image; and
   determine the traffic speed violation by the second vehicle based on the determined second change and the speed of the first vehicle.

9. The electronic apparatus according to claim 8, wherein the determined second change corresponds to one of an increase or a decrease in the font-size of the license plate number on the first license plate image with respect to the font-size of the license plate number on the second license plate image.

10. The electronic apparatus according to claim 1, wherein the circuitry is further configured to:
receive, via a location sensor, location information associated with the first vehicle; and
determine the speed of the first vehicle based on the received location information.

11. A method, comprising:
controlling an image-capture device installed in a first vehicle to capture a sequence of images of a second vehicle;
detecting a license plate of the second vehicle in each image of the captured sequence of images;
determining a time instant at which a speed of the first vehicle, in which the image-capture device is installed, is equal to a defined speed limit;
selecting a set of images from the captured sequence of images based on the determined time instant, wherein the selected set of images corresponds to the time instant at which the speed of the first vehicle is equal to the defined speed limit;
extracting, from the selected set of images in the captured sequence of images, a set of license plate images corresponding to the detected license plate;
determining a first change in a size of a first license plate image of the extracted set of license plate images with respect to a size of a second license plate image of the extracted set of license plate images;
determining a traffic speed violation by the second vehicle based on the determined first change; and
controlling a media device to output a notification indicative of the determined traffic speed violation.

12. The method according to claim 11, further comprising:
inputting the captured sequence of images to a Deep Neural Network (DNN) trained on a license plate detection (LPD) task;
extracting a sequence of LPD results as an output of the DNN for the input sequence of images, wherein the output of the DNN comprises bounding box coordinates of the license plate and an LPD confidence score indicating a likelihood of the license plate within the bounding box coordinates; and
detecting the license plate of the second vehicle in each image of the captured sequence of images based on the extracted sequence of LPD results.

13. The method according to claim 11, wherein
the defined speed limit is a legal maximum speed or a legal minimum speed at which the second vehicle is allowed to move on a road.

14. The method according to claim 11, further comprising determining a relative speed of the second vehicle with respect to the speed of the first vehicle based on the determined first change.

15. The method according to claim 14, further comprising determining the traffic speed violation by the second vehicle based on a determination that the determined relative speed indicates that an absolute speed of the second vehicle is greater than the defined speed limit,
wherein the defined speed limit is a legal maximum speed at which the second vehicle is allowed to move on a road.

16. The method according to claim 14, further comprising determining the traffic speed violation by the second vehicle based on a determination that the determined relative speed indicates that an absolute speed of the second vehicle is less than the defined speed limit,
wherein the defined speed limit is a legal minimum speed at which the second vehicle is allowed move on a road.

17. The method according to claim 11, further comprising:
determining a second change in a font-size of a license plate number on the first license plate image with respect to a font-size of the license plate number on the second license plate image; and
determining the traffic speed violation by the second vehicle based on the determined second change and the speed of the first vehicle.

18. A non-transitory computer-readable storage medium configured to store computer-executable instructions which, when executed by a processor of an electronic apparatus, causes the processor to perform operations, the operations comprising:
controlling an image-capture device installed in a first vehicle to capture a sequence of images of a second vehicle;
detecting a license plate of the second vehicle in each image of the captured sequence of images;
determining a time instant at which a speed of the first vehicle, in which the image-capture device is installed, is equal to a defined speed limit;
selecting a set of images from the captured sequence of images based on the determined time instant, wherein the selected set of images corresponds to the time instant at which the speed of the first vehicle is equal to the defined speed limit;
extracting, from the selected set of images in the captured sequence of images, a set of license plate images corresponding to the detected license plate;
determining a first change in a size of a first license plate image of the extracted set of license plate images with respect to a size of a second license plate image of the extracted set of license plate images;
determining a traffic speed violation by the second vehicle based on the determined first change; and
controlling a media device to output a notification indicative of the determined traffic speed violation.

* * * * *